United States Patent
Chiang

(10) Patent No.: US 11,647,107 B2
(45) Date of Patent: May 9, 2023

(54) MOUNTING DEVICE FOR MOUNTING ELECTRONIC PRODUCT

(71) Applicant: Nanning FuLian FuGui Precision Industrial Co., Ltd., Nanning (CN)

(72) Inventor: Qiao-Lun Chiang, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 2 days.

(21) Appl. No.: 17/357,639

(22) Filed: Jun. 24, 2021

(65) Prior Publication Data
US 2022/0417356 A1  Dec. 29, 2022

(51) Int. Cl.
*F16B 2/06* (2006.01)
*H04M 1/04* (2006.01)
*F16M 13/02* (2006.01)

(52) U.S. Cl.
CPC .............. *H04M 1/04* (2013.01); *F16B 2/06* (2013.01); *F16M 13/02* (2013.01)

(58) Field of Classification Search
CPC .............. F16M 13/02; F16B 2/14; F16B 2/00
USPC ................ 248/221.11, 227.4, 228.5, 228.7
See application file for complete search history.

(56) References Cited

U.S. PATENT DOCUMENTS

| | | | | |
|---|---|---|---|---|
| 4,579,492 A | * | 4/1986 | Kazino | F16B 21/086 411/15 |
| 5,822,941 A | * | 10/1998 | Kinsella | E04B 9/28 52/712 |
| 6,119,906 A | * | 9/2000 | Bond | A47G 25/483 223/96 |
| 10,774,985 B1 | | 9/2020 | Ortel et al. | |
| 2012/0271363 A1 | * | 10/2012 | Luxon | A61B 17/8625 606/304 |

FOREIGN PATENT DOCUMENTS

| | | |
|---|---|---|
| CN | 203729481 U | 7/2014 |
| CN | 109958864 A | 7/2019 |
| CN | 213512796 U | 6/2021 |

* cited by examiner

*Primary Examiner* — Terrell L McKinnon
*Assistant Examiner* — Jerry Olivier
(74) *Attorney, Agent, or Firm* — ScienBiziP, P.C.

(57) ABSTRACT

A mounting device for easy mounting of a wireless device includes a clamping structure configured to clamp a support frame. The clamping structure includes a base including an upper surface and a lower surface, a first clamping part rotatably connected to the base, a second clamping part rotatably connected to the base, and a connection portion connected to the lower surface of the base. The wireless device is thus supported. The support frame is clamped between the upper surface and the first clamping part, and the support frame is clamped between the upper surface and the second clamping part.

10 Claims, 7 Drawing Sheets

MOUNTING DEVICE FOR MOUNTING ELECTRONIC PRODUCT

FIELD

The subject matter herein generally relates to mounting devices for mounting electronic products.

BACKGROUND

Wireless communication devices can provide network communication. Generally, the communication devices are mounted on support frames by mounting devices, on the ceiling for example.

However, the structure of conventional mounting devices is complicated, resulting in high price. In addition, the process of assembling the mounting devices is complex, which increases the difficulty of the user in assembling or disassembling his network. Consequently, it would be desirable to provide a solution for improving the mounting devices.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
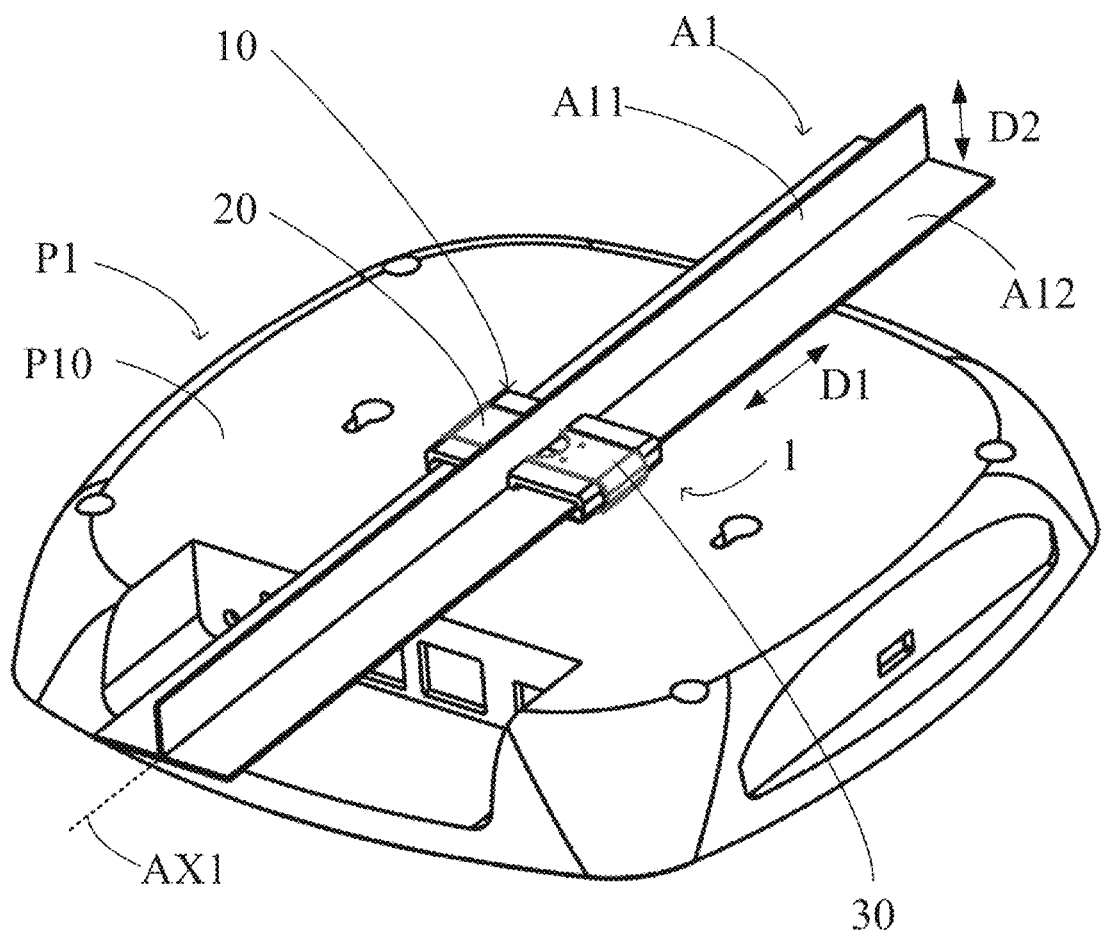
FIG. 1 is a perspective view of a mounting device in one embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of embodiments and not by way of limitation in the figures of the accompanying drawings, in which like references indicate similar elements.

It should be noted that references to "an" or "one" embodiment in this disclosure are not necessarily to the same embodiment, and such references mean "at least one."

The term "connected" is defined as directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
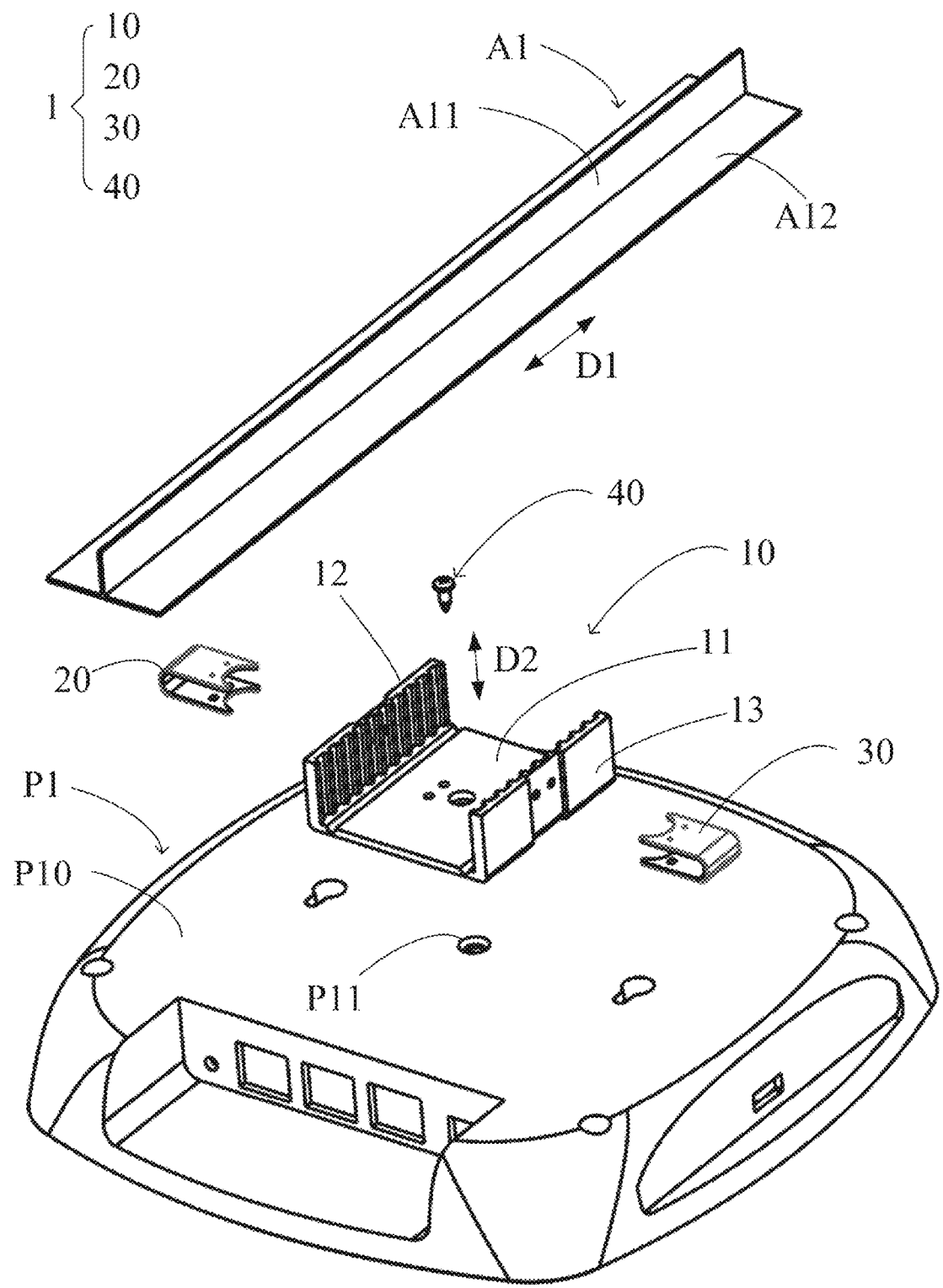
FIG. 2 is an exploded view of the mounting device of FIG. 1.

FIG. 1 is a perspective view of a mounting device 1 in an embodiment of the present disclosure. FIG. 2 is an exploded view of the mounting device 1 of FIG. 1. The mounting device 1 allows an electronic product P1 to be mounted on the support frame A1. Electronic product P1 can be a device such as a wireless router, a wireless access point, a router, or a projector, but it is not limited thereto. In the embodiment, the support frame A1 is disposed on a ceiling. The support frame A1 is an elongated horizontal structure with a cross section resembling an upside-down "T".

The support frame A1 includes a first plate A11 and a second plate A12. The first plate A11 and the second plate A12 extend in a longitudinal direction D1. The first plate A11 extends perpendicular to the second plate A12, and extends along the central axis AX1 of the second plate A12. The central axis AX1 extends in the longitudinal direction D1. In the embodiment, the second plate A12 extends along a horizontal plane, and the first plate A11 extends perpendicular to the horizontal plane. Edges of cover plates can be placed on the second plate A12, the cover plates and the second plate A12 forming a part of the ceiling.

The mounting device 1 includes a clamping structure 10, a first holding element 20, a second holding element 30, and a fastening element 40. The clamping structure 10 is configured to clamp the support frame A1, and configured to allow mounting of the electronic product P1. In FIG. 1, the clamping structure 10 is shown in a clamping position. In FIG. 2, the clamping structure 10 is shown in a released position. The first holding element 20 and the second holding element 30 are configured to maintain the clamping structure 10 in the clamping position of FIG. 1. The fastening element 40 secures the electronic product P1 on the clamping structure 10.

Figure 3:
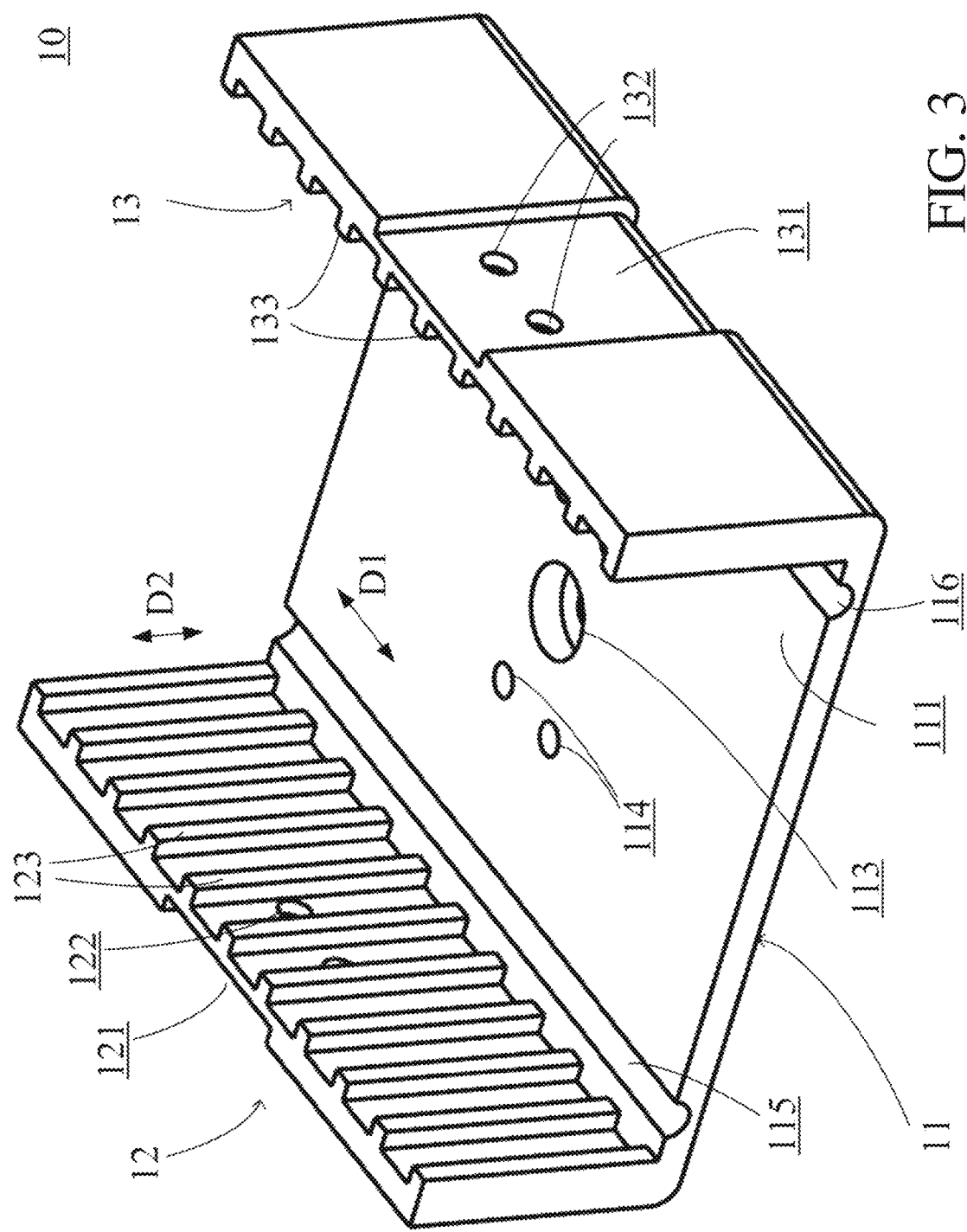
FIG. 3 and FIG. 4 are perspective views of a clamping structure in the mounting device of FIG. 2.
Figure 4:
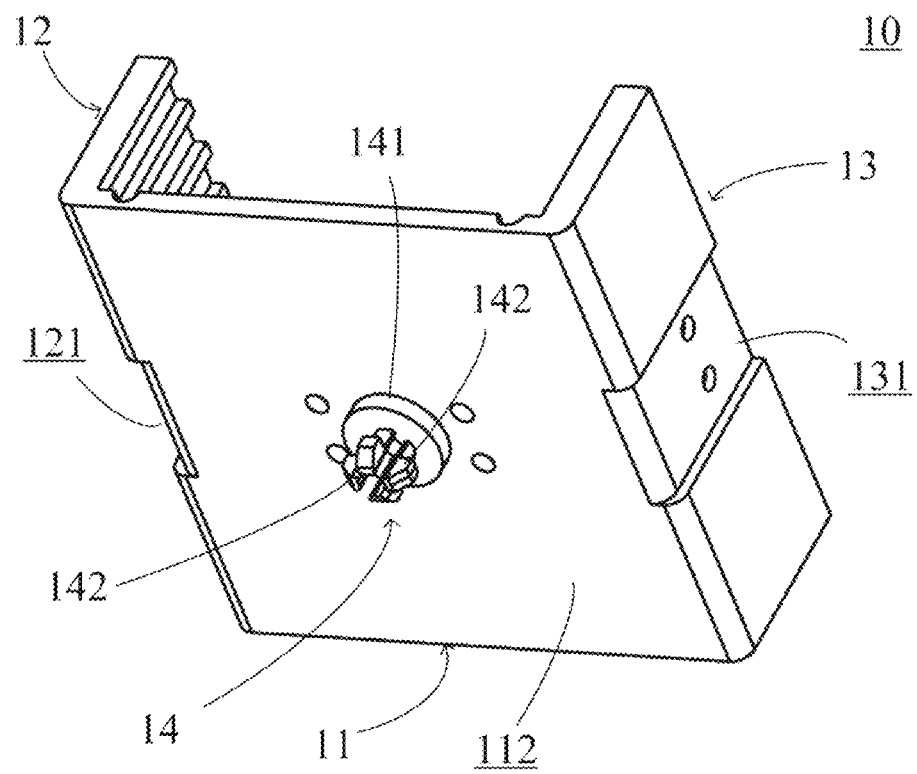

FIG. 3 and FIG. 4 are perspective views of the clamping structure 10 in an embodiment of the present disclosure. In FIG. 3 and FIG. 4, the clamping structure 10 is in a released position. The clamping structure 10 includes a base 11, a first clamping part 12, a second clamping part 13, and a connection portion 14. The base 11, the first clamping part 12, the second clamping part 13, and the connection portion 14 are made of plastic, and are an integral structure.

The base 11 is a plate-like structure, extending perpendicular to vertical direction D2. The vertical direction D2 is perpendicular to the longitudinal direction D1. The base 11 has an upper surface 111, a lower surface 112, a main groove 113, main position holes 114, a first trench 115, and a second trench 116. The upper surface 111 and the lower surface 112 extend perpendicular to the vertical direction D2, and the upper surface 111 is opposite to the lower surface 112. The main groove 113 is formed on upper surface 111, at the center of the upper surface 111.

The main position holes 114 are formed on the lower surface 112, and extend through the upper surface 111. In another embodiment, the main position holes 114 do not extend through the upper surface 111. The first trench 115 and the second trench 116 are formed on the upper surface 111, and extend through the longitudinal direction D1. In other words, the first trench 115 is parallel to the second trench 116. The first trench 115 is adjacent to the first clamping part 12, and the second trench 116 is adjacent to the second clamping part 13.

The first clamping part 12 and the second clamping part 13 are rotatably connected to the base 11. The first clamping part 12 can be bent relative to the base 11 by the first trench 115. The second clamping part 13 can be bent relative to the base 11 by the second trench 116. The first clamping part 12 and the second clamping part 13 are connected to two opposite sides of the base 11. When the clamping structure 10 is in a released position, the base 11, the first clamping part 12, and the second clamping part 13 are U-shaped structures. In the embodiment, the first clamping part 12 and the second clamping part 13 have the same size and structure. The first clamping part 12 and the second clamping part 13 are plate-like structures, and first clamping part 12 is parallel to the second clamping part 13.

When the clamping structure 10 is in the released position, the first clamping part 12 is inclined from or perpendicular to the base 11. The first clamping part 12 includes a first retaining groove 121, one or more first position holes 122, and one or more first ribs 123. The first retaining groove 121 is formed on the outer surface of the first clamping part 12, at the center of the first clamping part 12. The first position holes 122 are connected to the first retaining groove 121. In the embodiment, the first position holes 122 penetrate through the first clamping part 12. The first ribs 123 are formed on the inner surface of the first clamping part 12, to strengthen the first clamping part 12. The first retaining groove 121 is opposite to the first ribs 123.

When clamping structure 10 is in the released position, the second clamping part 13 is inclined from or perpendicular to the base 11. The second clamping part 13 includes a second retaining groove 131, one or more second position holes 132, and one or more second ribs 133. The second retaining groove 131 is formed on the outer surface of the second clamping part 13, and is in the center of the second clamping part 13. The second position holes 132 are connected to the second retaining groove 131. In the embodiment, the second position holes 132 penetrate through the second clamping part 13. The second ribs 133 are formed on the inner surface of the second clamping part 13, to strengthen the second clamping part 13. The second retaining groove 131 is opposite the second ribs 133.

The connection portion 14 is connected to the lower surface 112 of the base 11, and configured to be connected to the electronic product P1. The connection portion 14 includes a stage 141 and hook structures 142. The stage 141 is configured to be in contact with the electronic product P1, and separates the base 11 and the electronic product P1. The hook structures 142 are arranged in a circle, and hook the electronic product P1 in place. Therefore, when the clamping structure 10 is connected to the electronic product P1 via the connection portion 14, the electronic product P1 can be rotated relative to the clamping structure 10.

Figure 5:
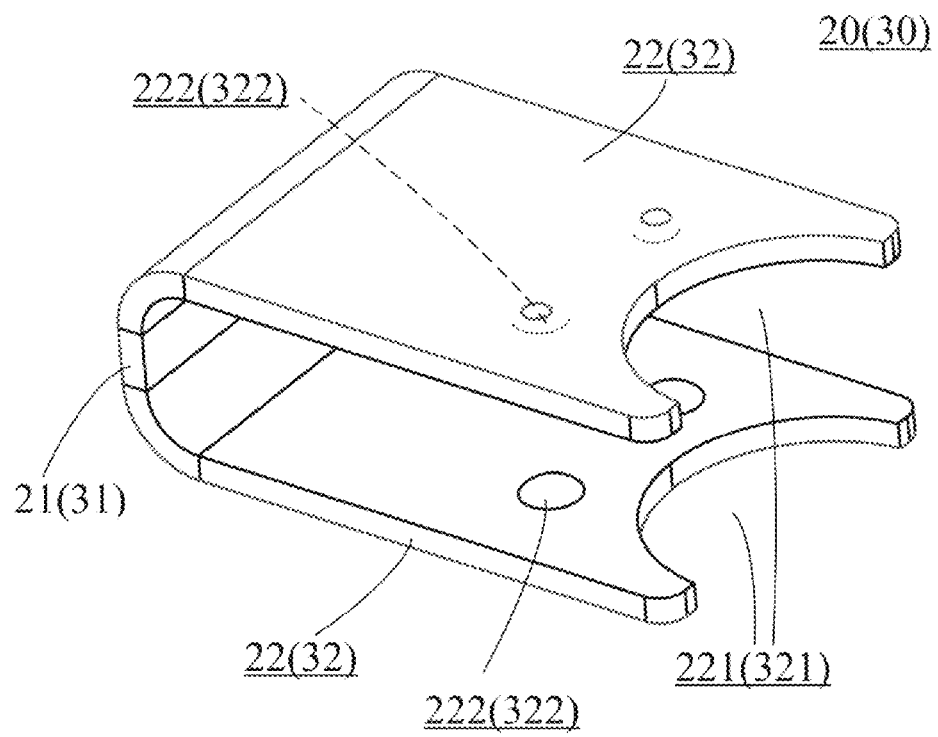
FIG. 5 is a perspective view of a first or second holding element in the mounting device of FIG. 2.

FIG. 5 is a perspective view of the first holding element 20 (or second holding element 30). The first holding element 20 and the second holding element 30 are identical in size and structure, to reduce manufacture costs. The first holding element 20 and the second holding element 30 are U-shaped structures. The first holding element 20 and the second holding element 30 are made of metal material.

The first holding element 20 is configured to clamp the base 11 and the first clamping part 12, so as to maintain the clamping structure 10 in the clamping position of FIG. 1. The first holding element 20 has a first bending portion 21 and two first holding arms 22. The first holding arms 22 are connected to opposite sides of the first bending portion 21 and are separated from each other. In the embodiment, the first holding arms 22 are parallel to each other. Each of the first holding arms 22 includes a first matching groove 221 and one or more first position bumps 222. The first matching groove 221 corresponds to the shape of the side of the stage 141. When the first holding element 20 clamps the clamping structure 10, one of the first holding arms 22 is in the first retaining groove 121 of FIG. 3. Moreover, the first position bumps 222 are in the first position holes 122 of FIG. 3, and a portion of the stage 141 in FIG. 4 is in the first matching groove 221. The first retaining groove 121, the first position bumps 222, and the first position holes 122 act to prevent disengagement of the first holding element 20.

The second holding element 30 is configured to clamp the base 11 and the second clamping part 13, so as to maintain the clamping structure 10 in the clamping position of FIG. 1. The second holding element 30 has a second bending portion 31 and two second holding arms 32. The second holding arms 32 are connected to opposite sides of the second bending portion 31, and are separated from each other. In the embodiment, the second holding arms 32 are parallel to each other. Each of the second holding arms 32 includes a second matching groove 321 and one or more second position bumps 322. The second matching groove 321 corresponds to the shape of the side of the stage 141. When the second holding element 30 clamps the clamping structure 10, a second holding arm 32 is in the second retaining groove 131 of FIG. 3. Moreover, the second position bumps 322 are in the second position hole 132 of FIG. 3, and a portion of the stage 141 of FIG. 4 is in the second matching groove 321. The second retaining groove 131, the second position bumps 322, and the second position holes 132 act to prevent disengagement of the second holding element 30.

Figure 6:
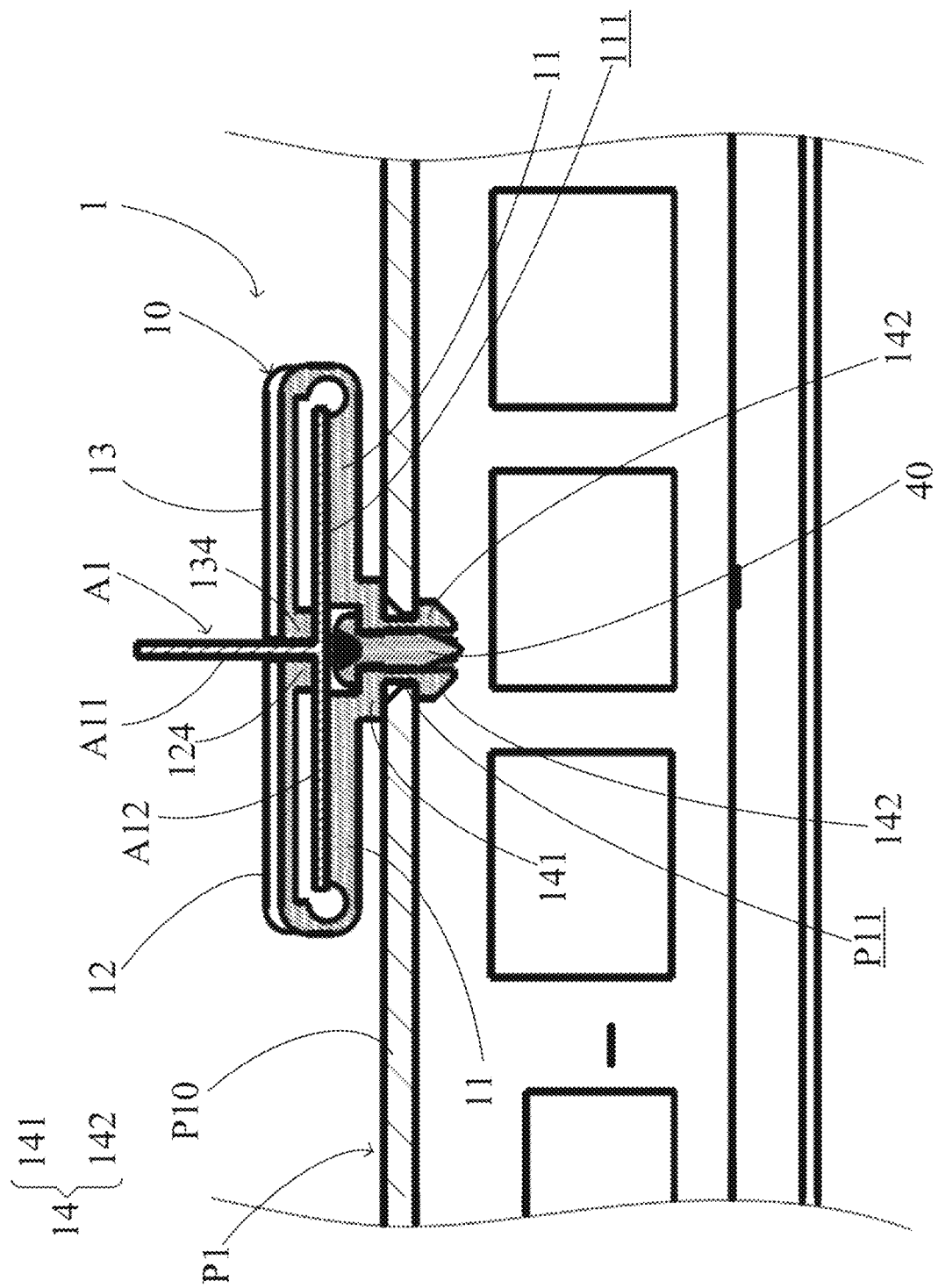
FIG. 6 and FIG. 7 are cross-sectional views of the mounting device during a mounting process.
Figure 7:
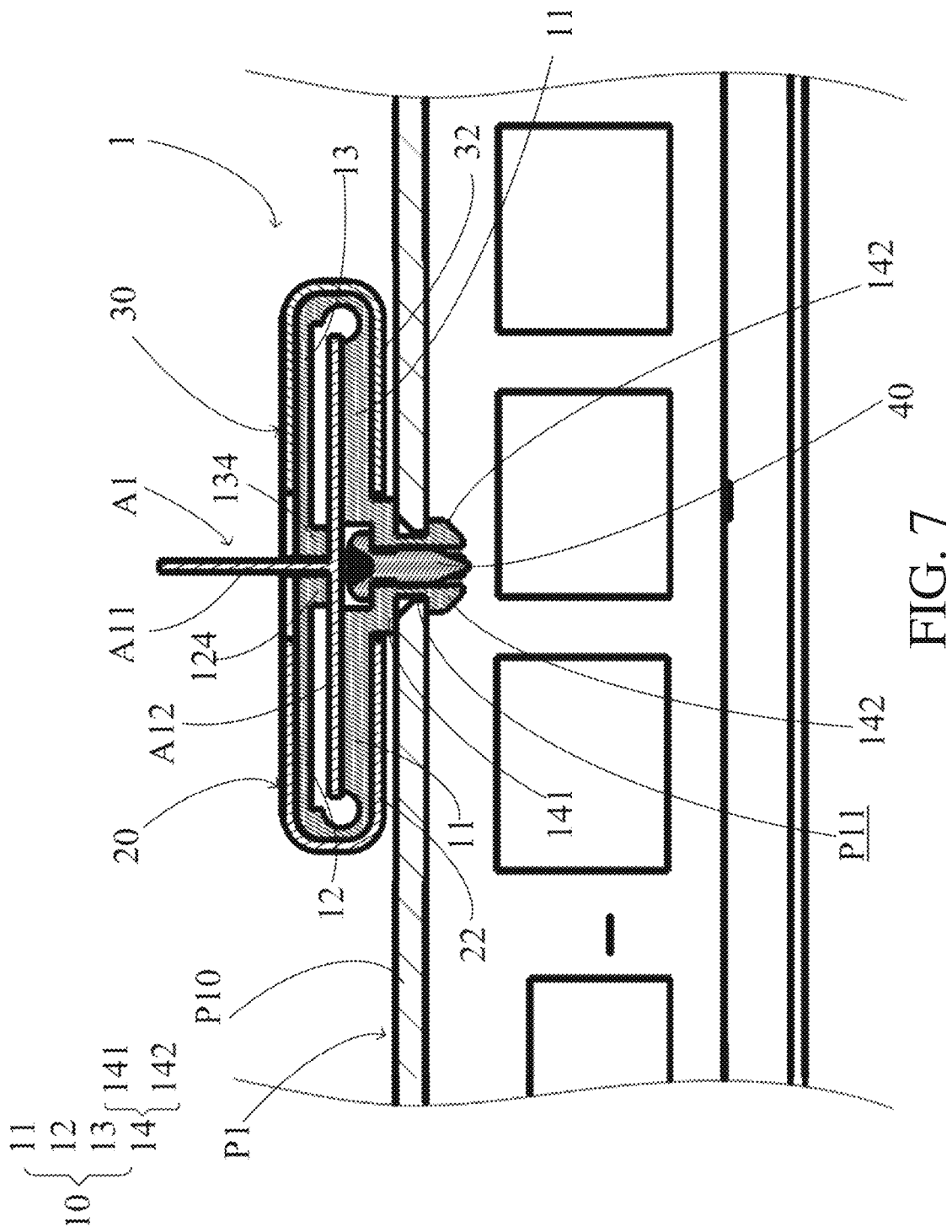

FIG. 6 and FIG. 7 are cross-sectional views of the mounting device 1 during a mounting process. When using the mounting device 1 for mounting purposes, first, the connection portion 14 of the clamping structure 10 is inserted into the mounting hole P11 of the electronic product P1. Next, the fastening element 40 passes through the connection portion 14, and pushes the hook structures 142, so they hook into the interior of the casing P10. At this time, the stage 141 abuts the housing P10 of the electronic product P1, so that there is a gap between the base 11 and the housing P10.

The support frame A1 is put on the base 11 of the clamping structure 10, between the first clamping part 12 and the second clamping part 13. Next, the first clamping part 12 and the second clamping part 13 are bent relative to the base 11, so that the second plate A12 of the support frame A1 is clamped between the upper surface 111 and the first clamping part 12, and the second plate A12 is clamped between the upper surface 111 and the second clamping part 13. At this time, there is a gap between the first free end 124 of the first clamping part 12 and the second free end 134 of the second clamping part 13, the first plate A11 of the support frame A1 is in the gap.

As shown in FIG. 7, the first holding element 20 clamps the base 11 and the first clamping part 12, and the second holding element 30 clamps the base 11 and the second clamping part 13 to maintain the clamped state of the clamping structure 10. Consequently, the assembly of mounting device 1 is very easy.

In this embodiment, one of the first holding arms 22 of the first holding element 20 is in the gap between the base 11 and the casing P10, and abuts the stage 141. One of the second holding arms 32 of the second holding element 30 is in the gap between the base 11 and the casing P10, and abuts the stage 141.

In this embodiment, the mounting device 1 can be easily removed from the support frame A1, after removing the first holding element 20 and the second holding element 30 from the clamping structure 10.

In this embodiment, the width of the base 11 is greater than the width of the second plate A12, so the clamping structure 10 can clamp another support frame in which the width of the second plate of the other support frame is smaller than the width of the second plate A12 in FIG. 7, for example.

Moreover, the width of the first clamping part 12 plus the width of the second clamping part 13 is close to the width of base 11. For example, the width of the first clamping part 12 plus the width of the second clamping part 13 is greater than 0.8 times the width of base 11 but less than the width of base 11. Therefore, the clamping structure 10 can clamp another support frame with a first plate that is higher or shorter than the first plate A11 in FIG. 7, for example. These widths are measured in the same direction perpendicular to the longitudinal direction D1.

Accordingly, the mounting device 1 can support frames of different specifications, which increases the convenience for users in installing the mounting device 1 and reduces the production cost of the mounting device 1.

Figure 8:
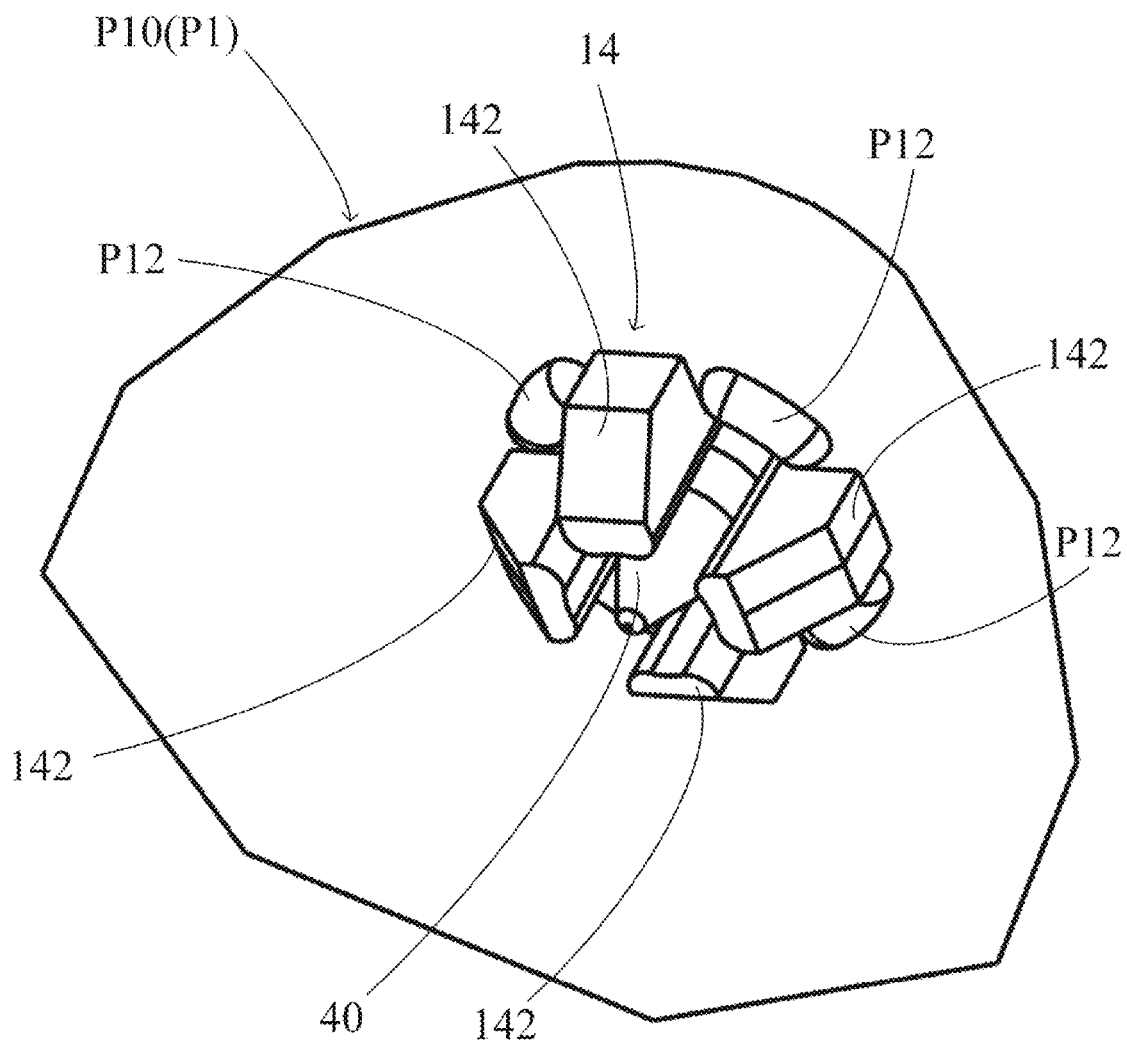
FIG. 8 is a perspective view of a connection portion of the mounting device holding an electronic product.

FIG. 8 is a perspective view of a portion of the connection portion 14 holding the electronic product P1. In the embodiment, the connection portion 14 includes four hook structures 142, the hook structures 142 are separated from each other. The electronic product P1 includes four protrusions P12, and the protrusions P12 are disposed on the inner surface of the casing P10. The number of hook structures 142 and protrusions P12 is not limited thereto. In the embodiment, the number of hook structures 142 corresponds to the number of protrusions P12.

The hook structures 142 and the protrusions P12 are alternately arranged along a circular path. Moreover, the height of the hook structure 142 relative to the casing P10 is greater than the height of the protrusion P12 relative to the casing. In the embodiment, the protrusions P12 increases the rotation-resistance of the electronic product P1 relative to the mounting device 1, which avoids unexpected rotation of the electronic product P1 relative to the mounting device 1.

In the present disclosure, the mounting device easily allows mounting of the electronic product on the support frame of the ceiling. The mounting device can be mounted on support frames of different sizes, which reduces the manufacturing cost of the mounting device. Moreover, the electronic product can be rotated relative to the support frame without disassembling the mounting device, which allows adjustment of the orientation of the electronic product.

Many details are often found in the relevant art, thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A mounting device configured to mount on a support frame comprising:
    a clamping structure configured to clamp the support frame, and comprising:
        a base comprising an upper surface and a lower surface opposite to the upper surface;
        a first clamping part rotatably connected to the base;
        a second clamping part rotatably connected to the base, wherein the first clamping part and the second clamping part are connected to opposite sides of the base; and
        a connection portion connected to the lower surface of the base, and configured to be connected to an electronic product; and
    a first holding element clamping the base and the first clamping part;
    wherein the base, the first clamping part, and the second clamping part are formed as a single piece,
    wherein the support frame is clamped between the upper surface and the first clamping part, and the support frame is clamped between the upper surface and the second clamping part.

2. The mounting device as claimed in claim 1, wherein the first clamping part comprises a first retaining groove, and a portion of the first holding element is in the first retaining groove.

3. The mounting device as claimed in claim 1, further comprising a second holding element, clamping the base and the second clamping part.

4. The mounting device as claimed in claim 3, wherein the second clamping part comprises a second retaining groove, and a portion of the second holding element is in the second retaining groove.

5. The mounting device as claimed in claim 3, wherein the first holding element and the second holding element are U-shaped structure.

6. The mounting device as claimed in claim 1, wherein when the clamping structure is in a released position, the base, the first clamping part, and the second clamping part are formed as a U-shaped structure, and the upper surface of the base comprises a first trench adjacent to the first clamping part, and a second trench adjacent to the second clamping part.

7. The mounting device as claimed in claim 1, wherein a gap is defined between a first free end of the first clamping part and a second free end of the second clamping part, and the support frame is in the gap.

8. The mounting device as claimed in claim 1, wherein the connection portion comprising a plurality of hook structures arranged in a circular path, wherein the electronic product is rotated relative to the clamping structure.

9. The mounting device as claimed in claim 8, further comprising a fastening element extending through the connection portion, and pushing the hook structure, and the hook structure is configured to retain the electronic product.

10. The mounting device as claimed in claim 8, wherein when the clamping structure is in a clamping position, the first clamping part and the second clamping part cover and are separated from the upper surface, and a first free end of the first clamping part faces the second free end of the second clamping part.

* * * * *